July 4, 1950 G. S. BECKMAN 2,514,175
CLUTCH
Filed Dec. 4, 1945
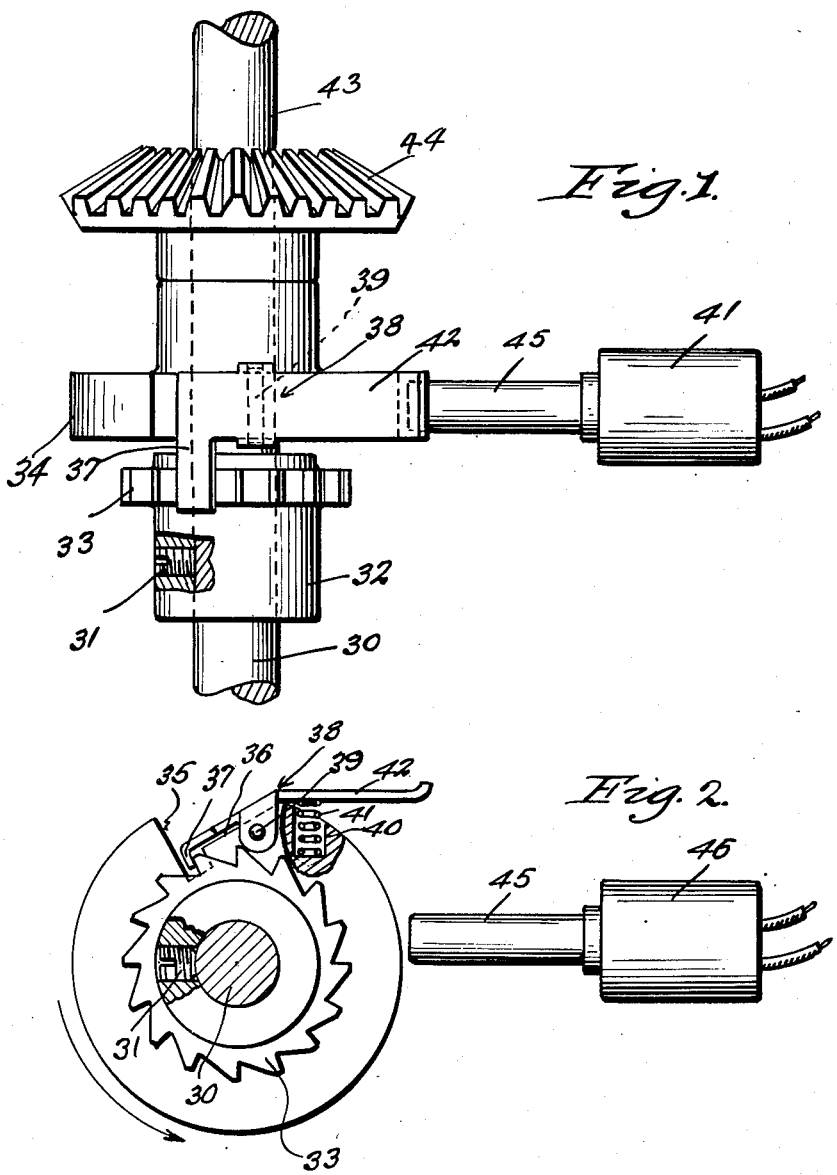
Inventor
GUSTAF S. BECKMAN Patented July 4, 1950

2,514,175

UNITED STATES PATENT OFFICE 2,514,175

CLUTCH

Gustaf S. Beckman, Cranston, R. I., assignor to Walter Scott Roberts, Mineral Wells, Tex.

Application December 4, 1945, Serial No. 632,719

1 Claim. (Cl. 192—26)

This invention relates to a clutch, and more particularly to a pawl type clutch adapted to be utilized in connecting a drive shaft and a driven shaft.

A primary object of this invention is the provision of an improved clutch provided with means affording a positive stop motion therefor at predetermined cycles of rotation of the drive or driven member associated therewith.

An additional object of the invention is the provision of such a clutch which may be advantageously utilized in power printing presses, type setting machines, thread winding machines, silk reeling machines, and for general operation in various types of automatically operated machines.

An additional object of the invention is the provision of an improved clutch embodying a positive stop action at predetermined cycles which may be readily utilized with chain drives, shaft drives, or any other desired mechanisms.

A still further object of the invention is the provision of an improved clutch mechanism characterized by simplicity in construction, reliability in operation, and efficiency and positive action in use.

Other objects reside in the combination of elements, arrangement of parts, features of construction, all as will be more fully pointed out hereinafter as disclosed in the accompanying drawings wherein there is shown a preferred embodiment of this inventive concept.

In the drawings:

Figure 1 is a top plan view of the preferred form of clutch construction, and

Figure 2 is an end view, partially in elevation, partially in section, and partially broken away, of the construction shown in Figure 1.

Similar reference characters refer to similar parts throughout the several views of the drawings.

There is generally indicated at 30 a drive shaft, to which is secured as by means of a set screw 31 a drum 32 carrying a ratchet 33 adjacent thereto. Positioned adjacent the ratchet 33 is a disc 34 having a cut-away portion 35, provided with a shoulder 36, into which is adapted to extend the inwardly turned end 37 of a member generally indicated at 38 and pivotally secured as on a pivot 39 to the drum 34, and comprising a pawl. The drum 34 is provided with a recess 40, in which is positioned a spring 41 which biases the outer extremity 42 of the member 38 outwardly normally to hold the ratchet in engagement with the pawl 38.

The drum 34 is suitably secured in any desired manner to a driven shaft 43, which may have keyed thereto or otherwise secured therewith a bevel gear or other driving mechanism 44. Positioned in the path of rotation of the extending portion 42 of member 38 is a mechanical obstruction 45, which may take the form of a solenoid plunger suitably controlled by an electrically operated solenoid 46. The arrangement is such that as long as the solenoid is retracted out of the path of the extremity 42 of the pawl member, as the device is rotated in the direction indicated by the arrows in Figure 5, the clutch is engaged by the engagement of the pawl with the teeth of the ratchet 33. However, as the plunger is advanced, and the extending portion 42 strikes theragainst the ratchet is released by the pawl, and the drive and driven shafts 30 and 43 released from their engagement. Obviously this may be effected either at every revolution of the device, or at any predetermined number thereof by any conventional automatic actuating means from the solenoid plunger 45.

It will be understood that while in the foregoing, solenoid plungers, electrically actuated have been described as the operating mechanisms for the clutch devices, a suitable mechanical means may be provided if desired, either automatically or manually controlled.

From the foregoing it will now be seen that there is herein provided a device accomplishing all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What I claim is:

In a clutch mechanism, coaxial driving and driven shafts, a drive member on the driving shaft including a ratchet, a driven member on the driven shaft and spaced longitudinally from the drive member and including a spring pressed pawl having an extending portion, said pawl being pivoted to said driven member upon a fulcrum parallel to the shaft axis, a peripheral notch in said driven member for receiving a portion of said pawl, said pawl being rotatable with said driven member, and a member adjacent said extending portion movable to bias said pawl away from said ratchet to release the connection between said drive and driven members, said last mentioned member comprising a solenoid plunger.

GUSTAF S. BECKMAN.

REFERENCES CITED

The following references are of record in the file of this patent:

UNITED STATES PATENTS

| Number | Name | Date |
|---|---|---|
| 471,777 | Stiles | Mar. 29, 1892 |
| 1,660,448 | Janda | Feb. 28, 1928 |
| 1,892,269 | Frykman | Dec. 27, 1932 |
| 2,049,690 | Cunningham | Aug. 4, 1936 |
| 2,163,596 | Fischer | June 27, 1939 |
| 2,347,425 | Mageoch | Apr. 25, 1944 |
| 2,368,892 | Skoog | Feb. 6, 1945 |